US010095918B2

(12) United States Patent
Gil et al.

(10) Patent No.: US 10,095,918 B2
(45) Date of Patent: *Oct. 9, 2018

(54) SYSTEM AND METHOD FOR INTERPRETING INTERPERSONAL COMMUNICATION

(71) Applicant: INTERNATIONAL BUSINESS MACHINES CORPORATION, Armonk, NY (US)

(72) Inventors: Dario Gil, Katonah, NY (US); Joseph N. Kozhaya, Morrisville, NC (US); David O. Melville, New York, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,909

(22) Filed: Jul. 20, 2017

(65) Prior Publication Data

US 2017/0323153 A1 Nov. 9, 2017

Related U.S. Application Data

(63) Continuation of application No. 14/755,752, filed on Jun. 30, 2015, now Pat. No. 9,760,766.

(51) Int. Cl.
*G06K 9/00* (2006.01)
*G10L 25/51* (2013.01)
(Continued)

(52) U.S. Cl.
CPC ..... *G06K 9/00315* (2013.01); *G06K 9/00302* (2013.01); *G06K 9/00355* (2013.01);
(Continued)

(58) Field of Classification Search
CPC .......... G06K 9/00302; G06K 9/00315; G06K 9/00355; G06K 9/00892; G06K 9/6255; G10L 25/51; G10L 25/63; H04N 7/15
See application file for complete search history.

(56) References Cited

U.S. PATENT DOCUMENTS 7,751,285 B1 * 7/2010 Cain .................... G04G 9/0017
368/10
8,600,731 B2 * 12/2013 Cunnington ........ H04L 12/1822
704/2

(Continued)

OTHER PUBLICATIONS

U.S. OA dated Dec. 30, 2016 in corresponding U.S. Appl. No. 14/755,752.

*Primary Examiner* — Amara Abdi
(74) *Attorney, Agent, or Firm* — F. Chau & Associates, LLC

(57) ABSTRACT

A method for interpreting interpersonal communication includes monitoring a first interaction between two or more individuals using a set of monitoring devices including a camera, a microphone, and the like. A culture and personality type of at least one individual is identified based on the monitored first interaction. First cultural/personality profile information specific to the identified culture and personality type is retrieved from a database of cultural/personality profile information. A second interaction between the two or more individuals is monitored using the set of monitoring devices. A first facial expression, gesture, vocal intonation, or indication of emotional state derived from biometric data of the at least one individual is identified based on the monitored second interaction. The identified first expression is interpreted using the first cultural/personality profile information. The interpretation of the identified first expression is communicated to a user.

8 Claims, 6 Drawing Sheets

(51) Int. Cl.
*G06K 9/62* (2006.01)
*G10L 25/63* (2013.01)
*H04N 7/15* (2006.01)

(52) U.S. Cl.
CPC .......... *G06K 9/00892* (2013.01); *G10L 25/51*
(2013.01); *G06K 9/6255* (2013.01); *G10L*
*25/63* (2013.01); *H04N 7/15* (2013.01)

(56) References Cited

U.S. PATENT DOCUMENTS

| | | | |
|---|---|---|---|
| 2005/0069852 A1* | 3/2005 | Janakiraman | G09B 21/003 |
| | | | 434/236 |
| 2006/0122903 A1* | 6/2006 | Medrano | G06Q 10/10 |
| | | | 705/500 |
| 2012/0151340 A1* | 6/2012 | Haug | G06F 3/017 |
| | | | 715/703 |
| 2013/0239024 A1* | 9/2013 | Lewis | H04N 7/147 |
| | | | 715/756 |
| 2017/0004356 A1 | 1/2017 | Gil et al. | |

* cited by examiner

SYSTEM AND METHOD FOR INTERPRETING INTERPERSONAL COMMUNICATION

CROSS-REFERENCE TO RELATED APPLICATION

This application claims priority under 35 U.S.C. § 120 to U.S. application Ser. No. 14/755,752 filed on Jun. 30, 2015 in the United States Patent and Trademark Office, the disclosure of which is incorporated by reference herein in its entirety.

TECHNICAL FIELD

Exemplary embodiments of the inventive concept relate to interpreting communication, and more particularly, to systems and methods for interpreting interpersonal communication.

DISCUSSION OF THE RELATED ART

Cross-cultural interactions between participants of different cultures are becoming more frequent in recent times. A first individual may interact with a second individual. The second individual may have a culture that is different from the first individual's culture. Thus, the first individual may need to acquire information regarding the second individual's culture. The first individual may gain information regarding the culture of the second individual by reading a book that describes the second individual's culture in detail, prior to the meeting.

Reading books to gain cultural information may be a difficult and time-consuming task. Further, an individual may interact with a plurality of individuals having a plurality of different cultures. Thus, reading a plurality of books to memorize information specific to a plurality of cultures may be a difficult task and an inefficient use of time.

SUMMARY

According to an exemplary embodiment of the inventive concept, a method for interpreting interpersonal communication includes monitoring a first interaction between two or more individuals using a set of monitoring devices including a camera, a video camera, or a microphone. A culture and personality type of at least one of the two or more individuals is identified based on the monitored first interaction. First cultural/personality profile information specific to the identified culture and personality type is retrieved from a database of cultural/personality profile information. A second interaction between the two or more individuals is monitored using the set of monitoring devices. A first facial expression, gesture, vocal intonation, or indication of emotional state derived from biometric data of the at least one of the two or more individuals is identified based on the monitored second interaction. The identified first facial expression, gesture, vocal intonation, or indication of emotional state derived from biometric data is interpreted using the first cultural/personality profile information. The interpretation of the identified first facial expression, gesture, vocal intonation, or indication of emotional state derived from biometric data is communicated to a user.

In an exemplary embodiment of the inventive concept, a third interaction between the two or more individuals may be monitored using the set of monitoring devices including the camera, the video camera, or the microphone. The identification of the first culture and personality type of the at least one of the two or more individuals may be updated based on the monitored third interaction. Second cultural/personality profile information specific to the updated identified culture and personality type may be retrieved from the database of cultural/personality profile information, the second cultural/personality profile information being different from the first cultural/personality profile information. A fourth interaction between the two or more individuals may be monitored using the set of monitoring devices including the camera, the video camera, or the microphone. A second facial expression, gesture, vocal intonation, or indication of emotional state derived from biometric data of the at least one of the two or more individuals may be identified based on the monitored fourth interaction. The identified second facial expression, gesture, vocal intonation, or indication of emotional state derived from biometric data may be interpreted using the second cultural/personality profile information. The interpretation of the identified first facial expression, gesture, vocal intonation, or indication of emotional state derived from biometric data may be communicated to a user.

In an exemplary embodiment of the inventive concept, the database of cultural/personality profile information may include a plurality of cultural/personality profile information specific to various culture and personality types.

In an exemplary embodiment of the inventive concept, the plurality of cultural/personality profile information specific to various culture and personality types may be generated based on an examination of training data.

In an exemplary embodiment of the inventive concept, the training data may include video imagery which has been annotated to indicate a culture and personality type of various participants and has been annotated to identify a meaning of one or more facial expressions, gestures, vocal intonations, and indications of emotional state derived from biometric data.

In an exemplary embodiment of the inventive concept, the user may be one of the two or more individuals other than the at least one of the two or more individuals.

In an exemplary embodiment of the inventive concept, the first and second interactions may be instantiated by a videoconference and the monitoring of the first and second interactions may include monitoring the videoconference.

In an exemplary embodiment of the inventive concept, the interpretation of the identified first facial expression, gesture, vocal intonation, or indication of emotional state derived from biometric data to the user may include superimposing the interpretation of the identified first facial expression, gesture, vocal intonation, or indication of emotional state derived from biometric data on a videoconference such that it may be observed by a party to the videoconference other than the at least one of the two or more individuals.

In an exemplary embodiment of the inventive concept, the interpretation of the identified first facial expression, gesture, vocal intonation, or indication of emotional state derived from biometric data, communicated to the user, may include advice on how to respond to the identified first facial expression, gesture, vocal intonation, or indication of emotional state derived from biometric data.

In an exemplary embodiment of the inventive concept, communicating the interpretation of the identified first facial expression, gesture, vocal intonation, or indication of emotional state derived from biometric data to the user may include sending the user a text message.

In an exemplary embodiment of the inventive concept, the user and the at least one of the two or more individuals may be the same person and the interpretation of the identified first facial expression, gesture, vocal intonation, or indication of emotional state derived from biometric data, communicated to the user, may include an indication that the identified first facial expression, gesture, vocal intonation, or indication of emotional state derived from biometric data is potentially detrimental to constructive conversation.

In an exemplary embodiment of the inventive concept, a culture and personality type of the two or more individuals who are not the user may also be considered in determining whether the identified first facial expression, gesture, vocal intonation, or indication of emotional state derived from biometric data is potentially detrimental to constructive conversation.

According to an exemplary embodiment of the inventive concept, a system for interpreting interpersonal communication includes a processor and a set of monitoring devices including a camera, a video camera, or a microphone. A non-transitory, tangible program storage medium, readable by the system for interpreting interpersonal communication, embodying a program of instructions executable by the processor, performs method steps for interpreting interpersonal communication. The method includes monitoring a first interaction between two or more individuals using the set of monitoring devices including the camera, the video camera, or the microphone. A culture and personality type of at least one of the two or more individuals is identified based on the monitored first interaction. First cultural/personality profile information specific to the identified culture and personality type is retrieved from a database of cultural/personality profile information. A second interaction between the two or more individuals is monitored using the set of monitoring devices including the camera, the video camera, or the microphone. A first facial expression, gesture, vocal intonation, or indication of emotional state derived from biometric data of the at least one of the two or more individuals is identified based on the monitored second interaction. The identified first facial expression, gesture, vocal intonation, or indication of emotional state derived from biometric data is interpreted using the first cultural/personality profile information. The interpretation of the identified first facial expression, gesture, vocal intonation, or indication of emotional state derived from biometric data is communicated to a user.

In an exemplary embodiment of the inventive concept, the set of monitoring devices may include one or more cameras mounted and pointed toward the at least one of the two or more individuals. The one or more cameras may be configured to automatically move to maintain focus on the at least one of the two or more individuals.

In an exemplary embodiment of the inventive concept, a wearable computer worn by the user may be included. The wearable computer may receive a message. The message may include the communication of the interpretation of the identified first facial expression, gesture, vocal intonation, or indication of emotional state derived from biometric data, via a textual message, an audible message, or a tactile message.

In an exemplary embodiment of the inventive concept, a handheld mobile device may be included. Communicating the interpretation of the identified first facial expression, gesture, vocal intonation, or indication of emotional state derived from biometric data to the user may include sending the user a text message that may be displayed on the handheld mobile device.

According to an exemplary embodiment of the inventive concept, a system for video conferencing includes a processor and two or more terminals, each of the two or more terminals including a set of monitoring devices including a camera, a video camera, or a microphone. A non-transitory, tangible program storage medium, readable by the system for interpreting interpersonal communication, embodying a program of instructions executable by the processor, performs method steps for interpreting interpersonal communication. The method includes monitoring a first interaction between two or more individuals. A first individual of the two or more individuals is located at a first terminal of the two or more terminals. A second individual of the two or more individuals is located at a second terminal of the two or more terminals. Monitoring the first interaction between the two or more individuals includes using the set of monitoring devices including the camera, the video camera, or the microphone included in each of the first and second terminals to monitor the first and second individuals. A culture and personality type of at least one of the first and second individuals is identified based on the monitored first interaction. First cultural/personality profile information specific to the identified culture and personality type is retrieved from a database of cultural/personality profile information. A second interaction between the first and second individuals located at the first and second terminals is monitored using the set of monitoring devices including the camera, the video camera, or the microphone included in each of the first and second terminals. A first facial expression, gesture, vocal intonation, or indication of emotional state derived from biometric data of the at least one of the first and second individuals is identified based on the monitored second interaction. The identified first facial expression, gesture, vocal intonation, or indication of emotional state derived from biometric data is interpreted using the first cultural/personality profile information. The interpretation of the identified first facial expression, gesture, vocal intonation, or indication of emotional state derived from biometric data is communicated to a user.

In an exemplary embodiment of the inventive concept, the system for video conferencing may be a cloud-based system. The cloud-based system may include the two or more terminals communicating with the processor over the Internet.

In an exemplary embodiment of the inventive concept, each of the first and second terminals, among the two or more terminals, may include a display device and a camera device. The camera device included in the second terminal may be configured to automatically move to maintain focus on the second individual. The display device included in the first terminal may be configured to display a camera image captured by the camera device included in the second terminal.

In an exemplary embodiment of the inventive concept, the user and the first individual may be the same person. Communicating the interpretation of the identified first facial expression, gesture, vocal intonation, or indication of emotional state derived from biometric data to the user may include displaying a textual message on the display device included in the first terminal.

BRIEF DESCRIPTION OF THE DRAWINGS

The above and other features and aspects of the inventive concept will become more apparent by describing in detail exemplary embodiments thereof with reference to the accompanying drawings, in which.

DETAILED DESCRIPTION OF THE EMBODIMENTS

Figure 1:
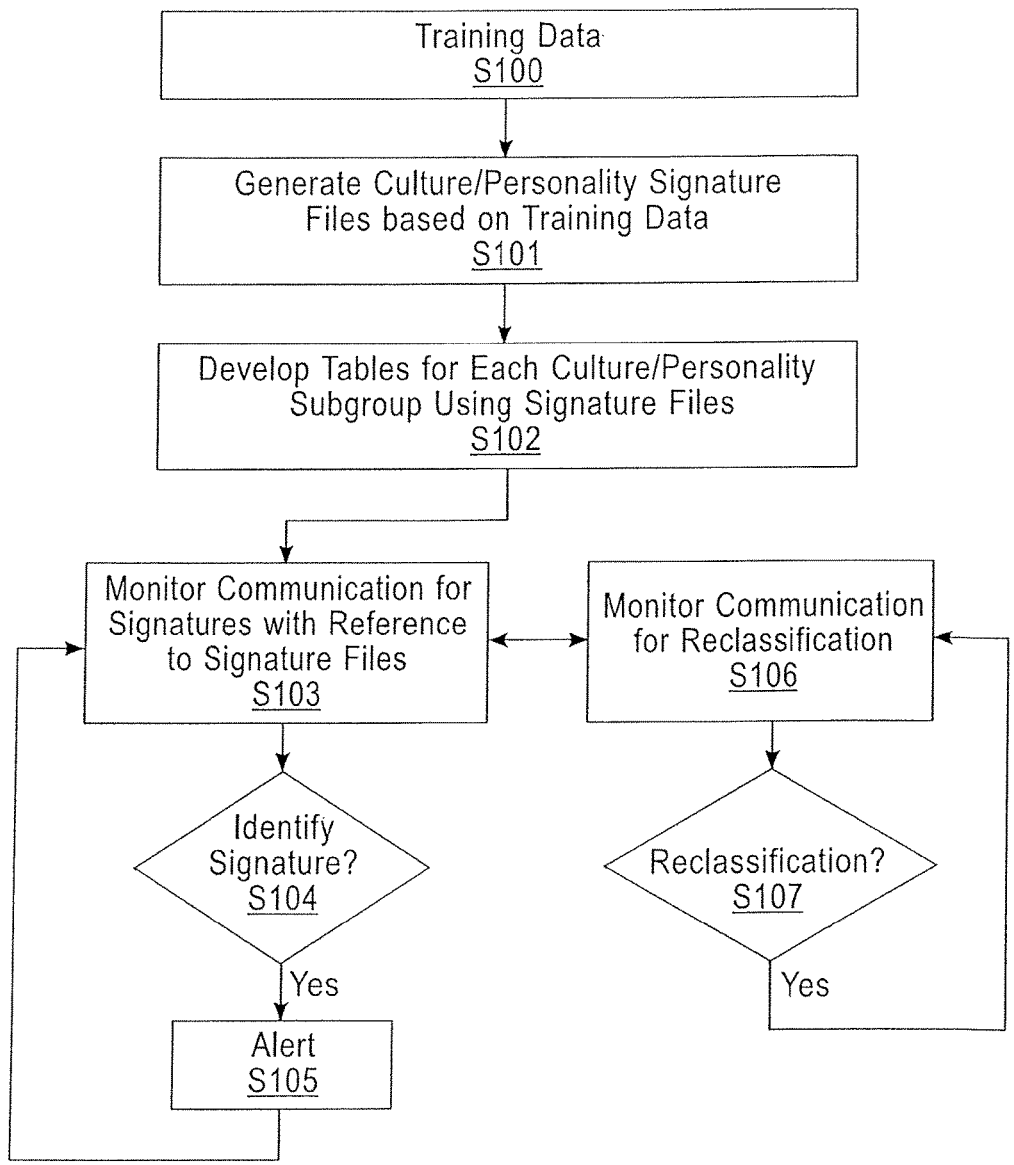
FIG. 1 illustrates a flow chart of a method for interpreting interpersonal communication, according to an exemplary embodiment of the inventive concept.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The flowcharts and/or block diagrams in the figures illustrate the architecture, functionality, and operation of possible implementations of systems, methods, and computer program products according to various exemplary embodiments of the inventive concept. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to an exemplary embodiment of the inventive concept, a method for interpreting interpersonal communication may include gathering training data. The training data may include visual data such as still images and video showing humans interacting with each other. The training data may include audible data such as sounds, vocal intonations, and the like, made by humans.

The training data may be annotated by a human expert. The human expert may identify and annotate the culture type of each individual shown on the videos by observing the acts and appearance of each individual. The human expert may identify and annotate the audible data or the combination of the visual and audible data by listening to the audible data and watching the videos with sound, respectively. The human expert may identify gestures, vocal intonations, facial expressions, and the like, that each actor may exhibit, and may annotate the gesture, vocal intonation and/or facial expression on the video, or audio, or combination of video and audio, as well as the interpretation of the gesture, vocal intonation and/or facial expression. For each culture type, individuals may be categorized into personality subgroups. Thus, each individual may be sorted into a pair of culture and personality subgroup. The expert may annotate the culture and personality type of each individual on the training data.

A first set of signature files may be created to determine the cultural and personality subgroup of at least one individual, among two or more individuals interacting with each other. The first set of signature files may be created using the annotated training data. For each cultural and personality subgroup, a second set of signature files may be created to identify facial expressions, gestures, vocal intonations, and the like, of individuals grouped in the particular culture/personality subgroup. The second set of signature files may be created using the training data. Alternatively, classifiers may be trained to perform what the signature files may perform.

A table may be developed for each culture/personality subgroup. The table may include entries for each culture/personality subgroup identified by the human expert using the training data. One entry on the table may correspond to one culture/personality subgroup. Each table entry may include the second set of signature files for detecting expressions and the corresponding interpretations of the expressions of the individuals classified as having the culture/personality subgroup corresponding to the entry.

A communication between two or more individuals may be monitored in real-time. The communication may be monitored with reference to the first and second sets of signature files to classify the individuals into culture/personality subgroups, to identify and interpret the individuals' expressions using the determined culture/personality subgroup for each individual, and to simultaneously reclassify the individuals into different culture/personality subgroups.

The individuals may receive alerts including the interpretation of actions that have been identified. Also, users may be alerted when actions that they are about to take may be offensive to another user that they are interacting with.

FIG. 1 illustrates a flow chart of a method for interpreting interpersonal communication, according to an exemplary embodiment of the inventive concept. Referring to FIG. 1, step S100 includes receiving training data. The training data may include videos displaying individuals acting, audio recording of individuals interacting, or video combined with audio of individuals interacting. A human expert may view the videos, hear the audio recordings, or view the videos combined with audio. The human expert may identify the culture of the individuals whose voice was played on the audio recordings, who were displayed on the videos, or who were displayed on the videos with sound. The personality type of each individual may be identified as a subgroup of the culture type of that individual. The human expert may annotate the identified culture and personality type of each individual on the respective audio recording, video, or video with sound. While viewing the video or videos with sound, and listening to the audio recordings, the human expert may identify meaningful indications of emotional state from biometric data, gestures, facial expressions, and vocal intonations made by the individuals. The human expert may annotate the meaningful indications of emotional state derived from biometric data, gestures, facial expressions, and vocal intonations on the respective video, video with sound, or audio recording. The human expert may interpret each annotated meaningful indication of emotional state derived from biometric data, gesture, facial expression, and vocal intonation and may annotate the interpretation (e.g., meaning of) each annotated meaningful indication of emotional state derived from biometric data, gesture, facial expression, and vocal intonation on the respective video, video with sound, or audio recording. The biometric data may be continuously gathered and may include the level of blood flowing through a person's cheeks (e.g., determine if an individual is showing signs of becoming flush). The expert may be looking for meaningful indications of emotional state from the biometric data. For example, the expert may see an individual showing signs of becoming flush. Accordingly, the expert may determine that the individual may be, for example, excited, embarrassed, upset, offended, or the like. For example, an expert may view a video showing a first individual slowly and carefully bowing to a second individual. The expert may annotate the video to indicate that the first individual may have a culture prevalent among inhabitants of Japan and a passive personality. The expert may annotate the video to indicate that the bowing of the first individual is a bowing gesture and may annotate the video to indicate the interpretation of the bowing gesture (e.g., a salutation). The expert may perform the above-mentioned steps for each audio, video, and video with sound received (e.g., training data), and for each person featured on the training data. The expert may also annotate facial expressions or gestures on training data that may include, for example, still images.

Step S101 may include generating culture/personality signature files using the received training data. After annotating the videos, videos with sound, still images, and audio recordings, signature files may be created using the annotated videos, videos with sound, still images, and audio recordings. The signature files may be used to identify a culture/personality subgroup of an individual in real-time audio and video, and expressions of the individual in real-time audio and video. Alternatively, classifiers may be trained to determine the culture/personality type and expressions of an individual.

A first set of signature files may be trained to determine the culture and personality subgroup of an individual. A second set of signature files may be trained to identify an individual's expressions and meaningful indications of emotional state from biometric data. The individual's expressions may include facial expressions, gestures (e.g., bowing), and vocal intonations. For example, the second set of signature files may identify a bowing gesture on a video, or video with sound, illustrating a person bowing.

Step S102 may include developing a table with entries for all the different culture/personality subgroups identified in the training data of step S100. The table may include one entry for each culture/personality subgroup identified using the training data. The entry for each culture/personality subgroup may include the second set of signature files for detecting expressions and the corresponding interpretation of each detected expression. One signature file may detect one expression. Thus, the entry for each culture/personality subgroup may contain a plurality of signature files and a plurality of interpretations corresponding to the plurality of signature files.

Step S106 may be simultaneously performed with step S103. In step S106, a communication between two or more individuals may be monitored in real-time using video, audio, or video and audio combined to classify the culture/personality subgroup of at least one of the two or more individuals with reference to a first set of signature files. In step S103, the communication between the two or more individuals may be monitored in real-time, using video, audio, or audio and video combined detect expressions of at least one of the two or more individuals using a second set of signature files corresponding to the culture/personality subgroup of the at least of the two or more individuals.

For example, a first individual, among the two or more interacting individuals, may say "howdy, it is nice to meet you" in a bolstering voice. The first set of signature files may identify "howdy, it is nice to meet you," in a bolstering voice, as an expression used by residents of the southwest United States, and may classify the first individual, for example, as having a culture prevalent among residents of the southwest United States and a forward-type personality.

In step S106, the classification of the culture/personality subgroup of the at least one of the two or more individuals may be communicated to step S103. In step S103, the communication between the two or more individuals may be monitored with reference to the second set of signature files included in the entry of the table created in step S102 that corresponds to the identified culture/personality subgroup of the at least one of the two or more individuals to identify expressions of the at least one of the two or more individuals. For example, the first individual, having a culture prevalent among residents of the southwest United States and a forward-type personality may extend a handshake to a second individual. The handshake offer may be monitored with reference to the second set of signature files corresponding to the culture/personality subgroup of the first individual.

In step S104, when an expression is identified for the at least one of the two or more individuals using the second set of signature files, the interpretation of the gesture identified by the second set of signature files may be retrieved using the table entry corresponding to the culture/personality subgroup of the at least one of the two or more individuals. The interpretation of "howdy, it is nice to meet you," may be that the first individual is greeting someone and is being courteous.

In step S105, the identified expression of the at least one of the two or more individuals may be communicated to a user (e.g., the user may be alerted). The user may be the individual who was monitored, one of the two or more interacting individuals, or an individual not a party to the interaction. For example, the first individual may be speaking to a second individual in a loud voice. The first individual may be alerted that he or she was speaking too loudly. In step S105, recommendations may be communicated to the user. For example, the first individual who was speaking in a loud voice may receive a recommendation to lower his/her voice. The communication may be conveyed to the user in real-time (e.g., as soon as the communication becomes available), on after a delay.

When the expression identified in step S104 is interpreted to be an offensive expression, the user may be alerted that the expression is offensive and the culture/personality subgroup of the individual who made the offensive gesture may be reclassified. For example, if the first individual made an offensive hand gesture, step S105 would communicate the offensive gesture and the interpretation of the offensive gesture to step S103. Step S103 would communicate the offensive gesture and the interpretation of the offensive gesture to step S106. Step S106 would communicate the offensive gesture and the interpretation of the offensive gesture to step S107. In step S107, the already-classified culture/personality subgroup of the at least one individual may be reclassified using the offensive gesture and the interpretation of the offensive gesture. For example, the first individual may be reclassified as an English speaker having a culture prevalent among residents of southeastern United States, having an aggressive personality type.

Alternately, the at least one individual may be reclassified in step S107, using the first set of signature files, based on the continuous monitoring of the interaction between the two or more individuals. For example, the at least one individual may say something or act in a way that may cause the method for interpreting interpersonal communication to reclassify him or her into a different culture/personality subgroup. For example, the first individual may say "g'day mate" in a soft tone of voice. Based on the "g'day mate" in a soft tone of voice, the first individual may be reclassified as having the culture prevalent among inhabitants of Australia and a passive personality. When an individual's culture/personality subgroup is reclassified, the reclassified culture/personality type of that individual may be communicated to step S103. Thus, the monitoring of the communication for identifying expressions may be performed using the second set of signature files included in the table entry corresponding to the reclassified culture/personality subgroup of the at least one individual.

According to an exemplary embodiment of the present invention, a method for interpreting interpersonal communication may include generating a database of human cultures and personality subgroups.

Generating the database of human cultures and personalities may include receiving a plurality of videos and audio material featuring individuals speaking and/or acting. The individuals may exhibit their respective language, customs, habits, education level, skill in a particular area of interest, facial expressions, gestures, vocal intonations, and the like. A human expert may view the videos, still pictures, and videos with sound or may listen to audio recordings of people speaking.

The human expert may profile the individuals acting in the videos or in the audible data based on culture. For each culture, there may be subgroups based on the personality type of a particular individual. Each culture/personality subgroup may include various expressions and interpretations of the various expressions.

The expert may annotate videos, videos with sound, still pictures, or audio recordings to include the culture/personality subgroup of each individual. The expert may annotate each expression (e.g., facial intonation, gesture, or vocal intonation) of each actor in the videos, audio recordings, videos with sound, or still pictures, and may annotate the interpretation of each expression in the videos, audio recordings, videos with sound, or still pictures. The expert may also annotate an identification of a language that each individual speaks.

Each expert-identified culture/personality subgroup may include interpretations of biometric data, expressions, gestures, vocal intonations, and the like of the individual grouped in the particular culture/personality subgroup.

Signature files may be created or classifiers may be trained to determine the culture/personality type of an individual based on the annotated culture/personality subgroups and the annotated expressions included in the database.

The database may include entries for each expert-identified culture/personality subgroup. Each entry on the database may correspond to one culture/personality subgroup. A first set of signature files may determine the culture/personality subgroup of an individual. A second set of signature files may identify and interpret gestures, vocal intonations, and facial expressions of the individual using data included in the database entry corresponding to the individual's identified culture/personality subgroup. The first and second set of signature files may be included in the database.

The method for interpreting interpersonal communication may use a cognitive system to assist individuals of different cultures and personalities in interacting with each other. A cognitive system may include a plurality of cognitive subsystems assigned to each interacting individual. The cognitive system may include hardware such as a camera, a video camera, and a microphone to monitor individuals interacting with each other. The monitored interactions may include each individual's language, facial expression, gestures, vocal intonation, and the like. A cognitive subsystem of the cognitive system may interpret an individual's monitored language, facial expression, gesture, vocal intonation, and the like, using the first and second set of signature files and the generated database of human cultures and personalities and the second set of signature files. The cognitive subsystem may recommend a course of action for each of the individuals to take (e.g., what to say to another individual, how to act in front of the other individual, what gesture to display to the other individual, and the like) based on the interpretation of the monitored interaction between the individuals using the second set of signature files and the generated database of human cultures and personalities. The recommendations may increase the productivity of the interaction session between the two or more individuals. When individuals are classified into different culture/personality subgroups, the different cognitive subsystems assigned to the interacting individuals may communicate with each other via a higher level cognitive system. The higher level cognitive system is included in the cognitive system. The cognitive subsystems may communicate with the individuals they are assigned to, respectively.

The productivity of the interaction session may be increased, for example, by assisting the parties to come to an agreement. The recommended course of action may be conveyed to a recipient such as, for example, one of the parties participating in the conversation, immediately after the recommended course of action becomes available or after a delay.

The cognitive subsystem may also generate an alert to alert a user that the user's course of action may be offensive to another interacting participant.

After the user has been alerted or offered a recommended course of action, the method may loop to the beginning and may monitor the interaction between the two or more individuals. Based on the other monitored interaction, the culture/personality subgroup initially assigned to an individual may be changed to different culture/personality subgroup. However, an individual may also be reassigned to the same cultural/personality subgroup that the individual was previously assigned to. A first individual's course of action that may offend a second individual may also contribute to reassignment of the cultural/personality subgroup of the first individual.

Figure 2:
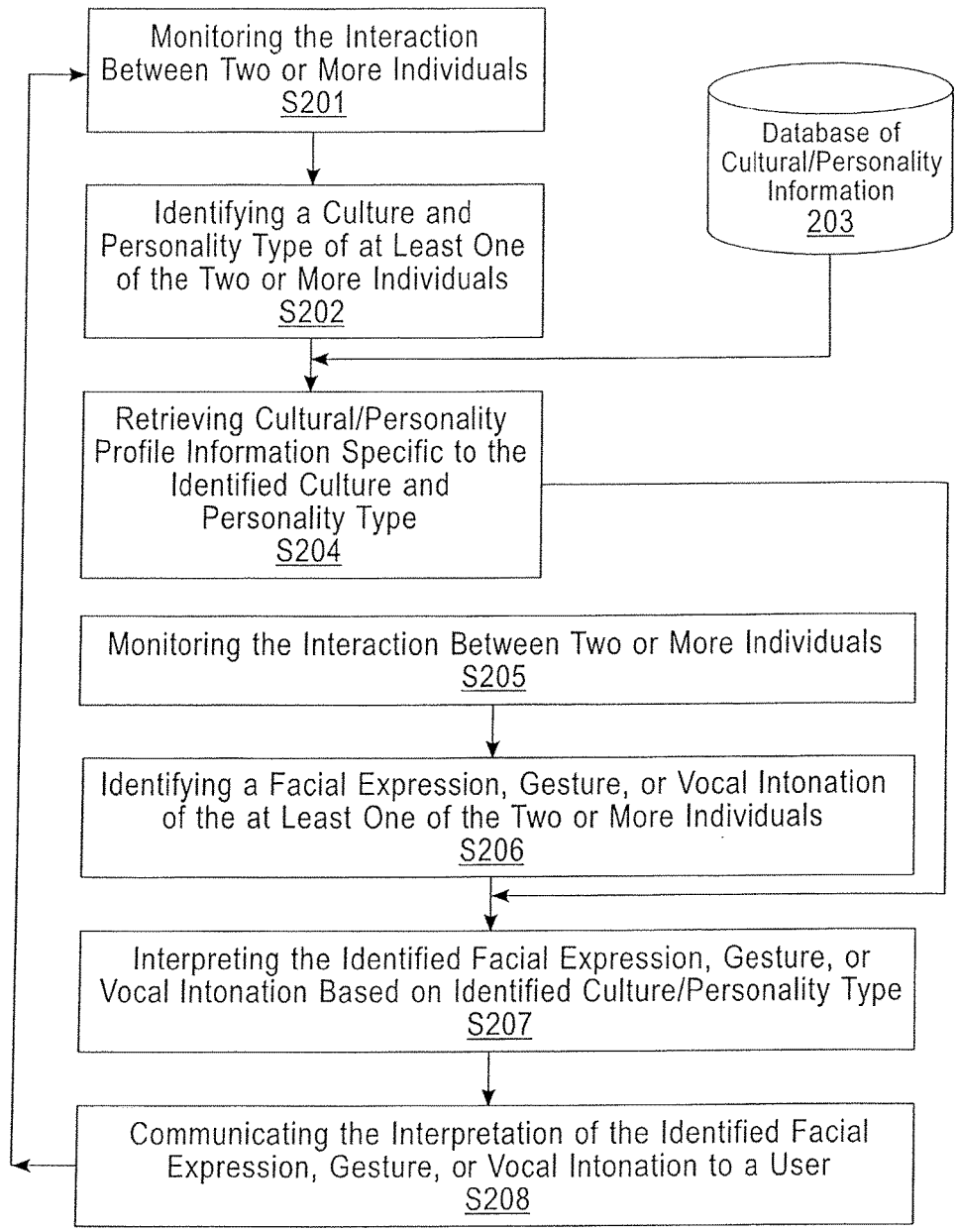
FIG. 2 illustrates a flow chart of a method for interpreting interpersonal communication, according to an exemplary embodiment of the inventive concept.

FIG. 2 illustrates a flow chart of a method for interpreting interpersonal communication, according to an exemplary embodiment of the inventive concept. Referring to FIG. 2, the method for interpreting interpersonal communication may include performing step S201. Step S201 may include monitoring an interaction between two or more individuals using a set of monitoring devices. The set of monitoring devices may include one or more cameras, video cameras, microphones, biometric data monitors, and the like. Monitoring the interaction between the two or more individuals in step S201 may include using the set of monitoring devices to capture an image, a video, or a sound emitted by one of the two or more interacting individuals. The cameras or video cameras may include biometric data monitors and may continuously detect an individual's biometric data such as blood flow in an individual's face or cheeks (e.g., the individual becomes flush).

The interaction between the two or more individuals may occur in-person, for example, where the two or more individuals meet face-to-face. The interaction between the two or more individuals may also occur via a videoconference, for example, where the two or more individuals may be located in different areas of the globe and may use videoconferencing devices such as display devices, cameras, and microphones to interact with each other. Whether the interaction between the two or more individuals is conducted in-person or via a videoconference, the set of monitoring devices may be used to capture images, videos, or sounds emitted by each of the two or more interacting individuals. For example, the set of monitoring devices may be used to monitor two or more individuals having a conversation in the same room.

The one or more cameras may capture still images or videos containing sound. The one or more cameras may be focused on one of the two or more individuals and may be automatically moved to maintain focus on that individual. One camera may be used to capture still images or videos of one of the two or more individuals. However, one camera may also be used to capture still images or videos of all of the individuals to the interaction. According to an exemplary embodiment of the inventive concept, a different camera may be used to capture still images or videos of each individual participating in an interaction between two or more individuals. For example, a first camera may be used to capture still images or videos of a first individual, from among the two or more individuals, and a second camera may be used to capture still images or videos of a second individual, from among the two or more individuals.

A video camera may capture videos containing sound and may be focused to track one of the two or more individuals to the interaction. The video camera may maintain focus (e.g., follow) the one of the two or more individuals when that individual moves. A different video camera may be configured to capture videos of each of the two or more individuals. According to an exemplary embodiment of the present invention, one video camera may be used to capture videos of all the interacting participants.

The microphones may be used to capture the voice, vocal intonation, and other sounds made by one or more individuals. One microphone may be used to capture sounds made by one individual, among the two or more individuals to the interaction. For example, a first microphone may be used to capture the voice of a first individual, a second microphone may be used to capture the voice of a second individual, and the like. However, a single microphone may be used to capture the sounds made by all of the interacting individuals.

Monitoring the interaction in step S201 may include capturing an image, video, or sound emitted by one or more individuals participating in an interaction between two or more individuals. The image, video, or sounds emitted by the one or more individual (e.g., a first person) may include a type of language spoken, words, vocal intonations, facial expressions, gestures made by an individual, and the like. The image, video, or sounds emitted by the first person may be captured using the set of monitoring devices. According to an exemplary embodiment of the present invention, monitoring the interaction in step S201 may include monitoring all the individuals to an interaction. For example, monitoring the interaction in step S201 may include monitoring an interaction between the first person and a second person. The first person may greet the second person by speaking words in the first person's native language. For example, the first person may say "g'day mate" to the second person. The second person may greet the first person by, for example, raising his/her left hand up.

According to an exemplary embodiment of the inventive concept, an interaction between two or more individuals may be instantiated by a videoconference. For example, the two or more individuals may interact via a teleconference, using the set of monitoring devices to see and hear each other. Thus, step S201 may include monitoring an interaction between two or more individuals on a videoconference.

Referring to FIG. 2, identifying a culture and personality type of at least one of the two or more individuals in step S202 may be based on the interaction that was monitored in step S201. For example, the interaction that was monitored in step S201 included the first person speaking words.

An individual's culture may include knowledge, beliefs, art, morals, customs, education, and any other attributes acquired by the individual. The individual may be a member of a society including a plurality of individuals who may share, to a degree, the same or substantially the same knowledge, beliefs, art, morals, customs, education, and other attributes. For example, the first person who spoke words to greet the second person in the above example may belong to a first culture.

An individual's personality may be a subset of that individual's culture. Individuals having the same culture may have different personalities. A person's personality type may include traits such as behavior patterns, manner of expressing emotions, temper, gullibility, humility, and the like.

A database of cultural/personality information 203 may include information specific to a plurality of culture types and a plurality of personality types.

The database of cultural/personality information 203 may be generated using videos (e.g., the training data) displaying individuals speaking and acting. Each video displaying at least one individual speaking and acting may be annotated by a human expert. The annotations may include an identification of the language spoken by an individual displayed on a video. Gestures, facial expressions, vocal intonations, and the like, made by each individual shown on a video, along with an interpreted meaning of each facial expression, gesture, and vocal intonation may be annotated on the video. A facial expression may be, for example, a smile a frown, a twitch, and the like. The human expert may annotate a smile and may interpret the smile to mean (e.g., signify) a kind gesture or a positive reception of an idea. The human expert may annotate a frown to mean, for example, discord or a disagreement on the part of one individual participating in an interaction between two or more individuals. A gesture may be a wink, a thumbs-up hand gesture, a handshake, a bow, a waving of the hand to signal departure, raising the left hand to greet someone, and the like. A vocal intonation may be a tone of voice having a constant pitch level (e.g., monotone pitch), which may signify a normal conversation, or changing pitch levels (e.g., a rising pitch, a falling pitch, a pitch that falls then rises, a pitch that rises then falls, and the like) to express emotion, surprise, sarcasm, and the like.

The human expert may identify the cultural/personality type of an individual included in the training data and may interpret the gestures of an individual included in the training data. The database of cultural/personality information 203 may include a list of expressions, gestures, vocal intonations, and the like, signature files or trained classifiers to identify the expressions, gestures, and vocal intonations of an individual, and the meaning of the expressions, gestures, and vocal intonations included in the training data. The signature files or trained classifiers may detect the culture/personality type of an individual in real-time audio, video, or video with audio, and may detect and interpret gestures, expressions, and vocal intonations of the individual having the detected culture/personality type using information stored in the database of cultural/personality information 203. A first set of signature files may detect the culture and personality type of an individual and a second set of signature files may detect gestures, vocal intonation, facial expressions, and the like, of an individual classified into a particular cultural/personality profile. The database of cultural/personality information 203 may include information regarding each type of culture and each type of personality that is included (e.g., indexed) in a database. For example, data describing a first culture, which may correspond to a culture shared among inhabitants of northeastern Australia, may indicate that a handshake symbolizes, for example, a greeting or an agreement, depending upon the context in which it is offered. Data describing a second culture, which may correspond to a culture shared among inhabitants of Japan, may indicate that a handshake symbolizes, for example, an insult. An agreement, under the second culture type, may be symbolized by a bow. However, the data describing the first culture and the data describing the second culture may overlap. For example, both the first culture and the second culture may interpret a smile as a positive reception of an idea.

Identifying the culture and personality type of the first person in the above example may include using the interaction that was monitored in step S201 with reference to the first set of signature files (e.g., analyzing and scanning the greeting spoken by the first person in real-time to identify a culture and a personality type of the first person with reference to a first set of signature files that may detect the culture/personality type of a person). For example, identifying the culture of the first person (e.g., the first culture) may include identifying the first person as an English speaker, originating from the northeastern portion of Australia, and having the knowledge, beliefs, art, morals, customs, and education prevalent among residents of northeastern Australia. The first person may be identified as, for example, an entrepreneur, using the first set of signature files. Identifying the personality type of the first person may include identifying the first person as being extroverted. Identifying the culture and personality type of the second person may include using the interaction monitored in step S201 (e.g., the second person raising his/her left hand up), with reference to the first set of signature files, to determine that the second person has a culture prevalent among inhabitants of Japan (e.g., a second culture) and that the second person has a passive personality.

Retrieving the cultural/personality profile information in step S204 may include retrieving cultural and personality profile information specific to the culture and personality type of the at least one of the two or more individuals identified in step S202 using the database of cultural/personality profile information 203. However, retrieving the cultural/personality profile information in step S204 may include retrieving cultural and personality information specific to each of the participants to the interaction. Information specific to the identified cultural/personality profile of an individual may be retrieved using the second set of signature files and the corresponding interpretation of the gestures identified by the second set of signature files.

An interaction between two or more individuals may be monitored, in real-time, using video, audio, or video with audio, with reference to the second set of signature files or trained classifiers. Gestures, expressions, or vocal intonations of an individual may be identified using the second set of signature files. For example, information indicating that the first person has a culture prevalent among the inhabitants of northeastern Australia and that the first person has an extroverted personality type may be retrieved. The retrieved first cultural and personality profile information may indicate that the first person may symbolize that he or she has reached an agreement by offering a handshake. Retrieving first cultural/personality profile information in step S204 may include retrieving information indicating that the second person has a culture prevalent among inhabitants of Japan, where a handshake symbolizes an insult and a bow symbolizes an agreement, and that the second person has a passive personality.

Monitoring the interaction in step S205 between two or more individuals using the set of monitoring devices including the one or more cameras, video cameras, microphones, and the like, may include capturing an image, video, or sound emitted by one or more interacting individuals using the set of monitoring devices. Monitoring the interaction in step S205 may be similar to monitoring the interaction in step S201. In fact, it may be the very same step, although it need not be. For example, monitoring the interaction in step S205 may include monitoring the first person, who belongs to the first culture, extending a hand to the second person.

As described above, the monitored interaction in step S205 may be instantiated via a videoconference. For example, as described above, the two or more individuals may interact via a teleconference using the set of monitoring devices to see and hear each other. The monitored interaction in step S205 between the two or more individuals may occur on the videoconference. However, since two individuals having a teleconference might not be able to shake hands, the monitored interaction in step S205 may include the first person substituting a handshake gesture for another gesture that might not require physical contact between the two or more teleconferencing individuals to indicate an agreement between the parties.

Identifying a facial expression, gesture, or vocal intonation of the at least one of the two or more individuals in step S206 may be based on the interaction monitored in step S205 and may include analyzing (e.g., scanning) the monitored interaction to identify a facial expression, gesture, or vocal intonation of one of the two or more individuals to an interaction with reference to a second set of signature files. The second set of signature files may detect expressions and gestures of individuals shown in videos, still images, and videos with sound. The videos may be live (e.g., real-time broadcasting of an individual acting and speaking) or previously recorded. The second set of signature files may detect vocal intonations, language spoken, and the like, in an audio stream. The audio stream may be live (e.g., real-time broadcasting of an individual speaking) or previously recorded. The second set of signature files may be applied to the real-time video, video with sound, or audio of an interacting person and may identify an expression of an individual when the individual exhibits a facial expression, gesture, or vocal intonation that the signature file may detect. Identifying the facial expression, gesture, or vocal intonation in step S206 may include identifying a plurality of facial expressions, a plurality of gestures, and a plurality of vocal intonations of all the individuals participating in the interaction. A description of the facial expressions, gestures, and vocal intonations is provided above and will be omitted for brevity. Identifying the facial expression, gesture, or vocal intonation of the at least one of the two or more individuals in step S206 may include, for example, identifying the first person's gesture of extending the hand to the second person.

Interpreting the identified facial expression, gesture, or vocal intonation of an individual in step S207 may include interpreting the facial expression, gesture, or vocal intonation identified in step S206 using the cultural/personality profile information retrieved in step S204. When a signature file identifies a gesture, facial expression, or vocal intonation, the interpretation of the gesture, facial expression, or vocal intonation of the identified gesture is retrieved from the database of cultural/personality information 203. The interpretation of the identified facial expression, gesture, or vocal intonation may include advice on how to respond to the identified first facial expression, gesture, or vocal intonation.

Communicating the interpretation of the identified facial expression, gesture, or vocal intonation to a user in step S208 may include communicating the interpretation of the identified facial expression, gesture, or vocal intonation of any of the two or more interacting individuals to a user. The user may be one of the individuals, from among the two or more individuals interacting with each other (e.g., the first person), or a person not a party to the interaction between the two or more individuals (e.g., a third party who is not one of the two or more interacting individuals).

For example, as described above, the first person extended his or her hand to the second person, attempting to shake hands with the second person. When the user is the second person, communicating the interpretation of the identified first facial expression, gesture, or vocal intonation to the user may include communicating to the user that the first person seeks to shake hands with the user, and that the handshake manifests a greeting.

Communicating the interpretation of the identified facial expression, gesture, or vocal intonation to the user in step S208 may include advising the user on how to respond to the identified first facial expression, gesture, or vocal intonation. For example, the retrieved cultural/personality profile information specific to the culture and personality of the user (e.g., the second person) may be retrieved from the database of cultural/personality information 203 in step S204. The retrieved information may indicate that the user (e.g., the second person) belongs to a culture (e.g., the second culture) where greetings are manifested by bowing. Thus, advising the user on how to respond to the identified first facial expression, gesture, or vocal intonation in step S208 may include communicating to the user a recommendation to greet the first person by bowing. Further, since the user may have a passive personality, advising the user on how to respond to the identified first facial expression, gesture, or vocal intonation may include recommending to the user to be more open to conversing with the first person to increase the productivity of the interaction between the first and second persons.

The retrieved cultural/personality profile information in step S204 corresponding to the second person may include data indicating that the second person belongs to a culture where a handshake signifies an insult and that the first person attempted to shake hands with the second person. When the user and the first person are the same individual, communicating the interpretation of the identified first facial expression, gesture, or vocal intonation (e.g., extending the hand in an attempt to shake hands with the second person) to the user may include communicating to the user (e.g., generating an alert) that offering a handshake to the second person is potentially detrimental to constructive conversation. Communicating the interpretation of the identified facial expression, gesture, or vocal intonation in step S208, to the user (e.g., the first person), may include advising the user to greet the second person by bowing. The advice to bow may be based on the cultural/personality profile information corresponding to the second individual retrieved in step S204 (e.g., information that indicates that the second culture may customarily greet by bowing).

Determining whether the facial expression, gesture, or vocal intonation identified in step S206 is potentially detrimental to constructive conversation between the two or more individuals may include considering the culture and personality type of the two or more individuals who are not the user. For example, the first culture of the first person described above may be a culture shared among northeastern Australians where the handshake symbolizes a greeting or an accord between two or more people. The first person may have an extroverted personality. Thus, the first person may be highly likely to offer a handshake to the second person in a business meeting, especially since the first and second persons belong to different cultures (e.g., the first person may be attempting to make a positive first impression on the second person). The second person, having the culture shared among inhabitants of Japan (e.g., the second culture), may perceive the handshake as an insult. Further, the second person may have a passive personality which may cause the second person to perceive the insult as being more severe than an extroverted person belonging having a culture shared among inhabitants of Japan. However, the first person did not intend to offend the second person. Thus, determining whether the identified first facial expression, gesture, or vocal intonation identified in step S206 is potentially detrimental to constructive conversation between the two or more individuals includes considering the culture and personality type of the two or more individuals who are not the user.

The determination of whether the identified facial expression, gesture, or vocal intonation is potentially detrimental to constructive conversation between the two or more individuals may include considering whether the facial expression, gesture, or vocal intonation identified in step S206 is detrimental to constructive conversation between the two or more individuals. If the identified facial expression, gesture, or vocal intonation is determined to be detrimental to constructive conversation between the two or more individuals, a degree of the severity of the detriment that may be caused by the identified facial expression, gesture, or vocal intonation may be communicated to the user.

Communicating the interpretation of the identified facial expression, gesture, or vocal intonation to the user in step S208, whether the user is one of the two or more interacting individuals or a person who is not any of the two or more interacting individuals, may include sending the user a text message, a voice message, a tactile message, an alert, and the like, to a wired or wireless communication device that the user may possess, view, hear, or feel. Each of the text message, the voice message, the tactile message, and the alert may convey the communicated interpretation of the identified first facial expression, gesture, or vocal intonation to the user, and may convey the advice to the user.

Since the user may be any of the two or more interacting individuals, all interacting individuals may view, hear, or feel alerts or messages generated by the wired or wireless communication device. The communication device may be a tablet computer, a laptop personal computer (PC), a desktop PC, a wireless phone, a walkie-talkie, an earpiece that may be worn by the user, a beeper, a smartwatch, and the like. The smartwatch may display messages, audibly read received messages, and may be programmed to notify the user by vibrating, the vibrations indicating that a message is received, that an advice is received, and the like. The earpiece may audibly deliver the communication of the interpretation of the identified first facial expression, gesture, or vocal intonation to the user, including any advice, to the user's ear.

Communicating the interpretation of the identified facial expression, gesture, or vocal intonation to the user in step S208 may also include e-mailing the user with a summary of the meeting and recommendations on increasing the productivity of a future meeting, uploading the summary and the recommendations to a database (e.g., a data storage bank accessible by the user, the two or more interacting individuals, or unrelated third persons, and uploading the summary and recommendations to a public repository. The communication of the interpretation of the identified facial expression, gesture, or vocal intonation in step S208 may be substantially instantaneous (e.g., delivered as soon as information to be communicated is generated), or delayed (e.g., the communication may be delivered when the meeting is over).

When the two or more individuals interact via teleconference, communicating the interpretation of the identified facial expression, gesture, or vocal intonation to the user in step S208 may include superimposing the interpretation of the identified facial expression, gesture, or vocal intonation on the videoconference so that it may be observed by the user (e.g., one of the two or more interacting individual or a third party who is not interacting with the two or more individuals). For example, the first person may nod during the teleconference session. The nodding may be the gesture identified in step S206. Thus, communicating the interpretation of the identified facial expression, gesture, or vocal intonation in step S208 may include superimposing text on the videoconference display viewed by the second person. The superimposed text may include the interpretation of the nod (e.g., the first's person's assent to a business model proposed by the second person). The superimposed text may be text appearing on the same screen that displays the other parties to the interaction (e.g., the first person) or on a communication device described above.

After communicating the interpretation of the identified facial expression, gesture, or vocal intonation to the user in step S208, the method for interpreting interpersonal communication may automatically loop to step S201 to monitor the interaction between the two or more individuals.

Once looped to monitoring the interaction between the two or more individuals in step S201, the method for interpreting interpersonal communication between two or more individuals may include using the set of monitoring devices to capture an image, a video, or a sound emitted by one of the two or more individuals. Monitoring the interaction in step S201 after looping may be substantially similar to monitoring the interaction in step S201 before looping. Monitoring the interaction in step S201, after looping, may include, for example, monitoring the first person speaking to the second person in English, with a smile and vocal intonation indicating excitement, the following words: "it is a pleasure to go over this business plan with you."

Identifying a culture and personality type of the at least one of the two or more individuals, may include updating an identification of the culture and personality type of at least one of the two or more individuals based on the monitored interaction in step S201 after looping, using the first set of signature files that may detect the culture and personality of an individual. Updating an identification of the culture and personality type of at least one of the two or more individuals may include updating (e.g., changing) the identification and of all interacting individuals based on the monitored interaction. Updating the identification of the culture and personality type of at least one of the two or more individuals based on the interaction monitored in step S201 after looping may include, for example, changing the identified culture and personality type of the first person, and clustering the first person as having a culture prevalent among southeastern Americans (e.g., residents of Georgia). The personality type of the first person may be changed to average (e.g., neither reserved nor extroverted). The changes to the first person's culture and personality type may be based on the signature files detecting the first person's words "it is a pleasure to go over this business plan with you," and detecting the smile of the first person and the excited tone of voice of the first person. Alternatively, updating an identification of the culture and personality type of at least one of the two or more individuals may include maintaining (e.g., not changing) the identified culture and personality type of the at least one of the two or more individuals. For example, the identified culture and personality type of the first person, after looping, would remain unchanged (e.g., the first person would be assigned to culture shared among northeastern Australians and would be assigned to an extroverted personality type).

In step S204, retrieving cultural/personality profile information specific to the updated identified culture and personality type of one of the individuals having an interaction from the database of cultural/personality profile information 203 may include retrieving a cultural profile and a second personality profile for each of the two or more interacting individuals specific to the updated culture and personality type of each individual. The information may be retrieved using the entry of the database 203 pertaining to the updated cultural/personality type of an individual. The retrieved information may include, for example, gestures, vocal intonations, and facial expressions, interpretations of the gestures, vocal intonations, and facial expressions, and signature files for detecting the gestures, vocal intonations, and facial expressions for the updated cultural/personality type of an individual. For a given individual, from among the two or more interacting individuals, the retrieved cultural profile information after looping may be different from the retrieved cultural/personality profile information prior to looping. As described above, the retrieved cultural/personality profile information prior to looping may indicate that the first person has a culture prevalent among the inhabitants of northeastern Australia and that the first person has an extroverted personality type. However, based on the updated identification of the cultural/personality type of the first person after looping, in step S204, the cultural/personality profile information that may be retrieved for the first person from the database of cultural/personality information 203 may correspond to a cultural profile shared among Georgians having an average personality. For example, the first person may be profiled as having the customs, habits, education level, and skill or training in a particular area of interest (e.g., training in attaining favorable business deals) of a Georgian business-oriented person.

The interaction monitored between the two or more individuals in step S205, after looping, may be monitored using the set of monitoring devices including the camera, the video camera, or the microphone. Monitoring the interaction in step S205 may be similar to monitoring the interaction in step S201. For example, monitoring the interaction in step S205 may include monitoring the second person nodding after a business offer was made to him or her (e.g., by the first person), using a video camera.

A facial expression, gesture, or vocal intonation of the at least one of the two or more individuals, after looping, may be identified based on the monitored interaction in real-time with reference to the signature files corresponding to the updated cultural/personality profile of the at least one of the two or more individuals. Identifying the facial expression, gesture, or vocal intonation of the at least one of the two or more individuals in step S206 may include, for example, having a signature file that may be applied to real-time video and/or audio data detect a gesture, facial expression, or vocal intonation of an individual. For example, in step S206, the monitored nodding of the second person may be identified as a nod made by the second person using the signature files.

The facial expression, gesture, or vocal intonation identified in step S206 may be interpreted in step S207. Interpreting the identified second facial expression, gesture, or vocal intonation of the at least one of the two or more individuals in step S207 may include retrieving the interpretation of the gesture, vocal intonation, or facial expression that corresponds to the gesture, facial expression, or vocal intonation detected by the second set of signature files. For example, interpreting the identified facial expression, gesture, or vocal intonation of the second person, after looping, may include interpreting the nodding of the second person as an assent to the business deal by the second person using the signature files associated with the updated cultural/personality type of the second person. The second person may have assented to, for example, the business proposition made to him or her by the first person.

In step S208, the interpretation of the identified facial expression, gesture, or vocal intonation, after looping, may be communicated to a user. The user may be one of the individuals, from among the two or more individuals interacting with each other, or a different person not a party to the interaction between the two or more individuals. Communicating the interpretation of the identified facial expression, gesture, or vocal intonation in step S208, after looping, may be similar to communicating the interpretation of the identified facial expression, gesture, or vocal intonation 107 after looping.

Communicating the interpretation of the identified facial expression, gesture, or vocal intonation to the user in step S208 may include, for example, sending an audible message to the user via an earpiece attached to the user's ear. The audible message may convey to the user, for example, the first person, that the second person assents to the first person's business proposition. The audible message may further recommend to the first person to bow to the second user as a sign of respect and to conclude the business dealing. In step S208, the interpretation of the identified facial expression, gesture, or vocal intonation may be communicated to the user in real-time or after a delay.

According to an exemplary embodiment of the inventive concept, a system for interpreting interpersonal communication may include a processor, a set of monitoring devices including a camera, a video camera, or a microphone, and a non-transitory, tangible program storage medium, readable by the system for interpreting interpersonal communication, embodying a program of instructions executable by the processor, to perform method steps for interpreting interpersonal communication.

Two or more individuals that may be located in the same area may interact with each using the system for interpreting interpersonal communication. The two or more individuals may be negotiating business transactions or may be simply interacting with each other. The two or more individuals may belong to different cultures, may have different personalities with respect to each other, and may speak different languages.

The two or more individuals may be communicating with each other in a room. The room may contain cameras, display devices, microphones, wearable computers, handheld mobile devices, and the like, connected to the system for interpreting interpersonal communication.

The system's cameras and microphones may be used to monitor an interaction between the two individuals. A culture and personality type of at least one of the two or more individuals may be determined using the monitored interaction.

The interaction between the two or more individuals may continue to be monitored by the cameras and microphones and a facial expression, gesture, or vocal intonation of at least one of the two interacting individuals, may be identified and interpreted by the system for interpreting interpersonal communication. The interpretation of the facial expressions, gesture, or vocal intonation of the individual may be communicated to the user via a display device, a wearable computer, or a handheld mobile device connected to the system for interpreting interpersonal communication.

Figure 3:
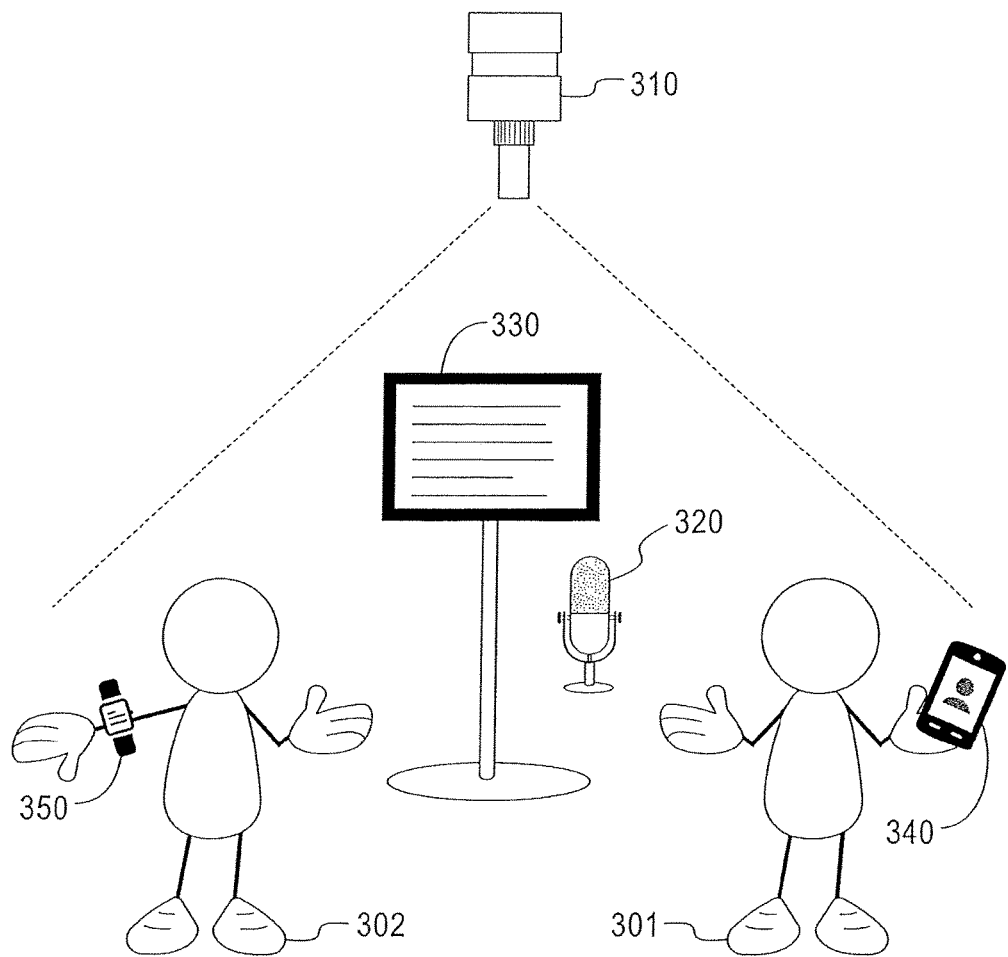
FIG. 3 illustrates a schematic diagram illustrating a system for interpreting interpersonal communication, according to an exemplary embodiment of the inventive concept.

FIG. 3 illustrates a schematic diagram illustrating a system for interpreting interpersonal communication, according to an exemplary embodiment of the inventive concept.

Referring to FIG. 3, the system for interpreting interpersonal communication (e.g., the system) may include a camera 310 for continuously monitoring the interaction between two or more individuals. For example, the camera 310 may be configured to continuously monitor a first individual 301 and a second individual 302. The camera 310 may obtain still images and/or video with sound of the first and second individuals 301 and 302. When more than two individuals interact with each other, the camera 310 may obtain still images and/or video with sound of all the interacting individuals.

The microphone 320 may be connected to the system and may be configured to monitor the interaction between the two or more individuals. For example, the microphone 320 may capture sounds emitted by all the interacting individuals. According to an exemplary embodiment of the present invention, the microphone 320 may capture sounds made by the first and second individuals 301 and 302.

The camera 310 may be pointed toward a specific individual among the two or more interacting individuals. The camera 310 may be configured to automatically move to maintain focus on a specific individual. For example, the camera 310 may be configured to automatically move to maintain focus on the first individual's 301 face even when the first individual 301 moves or rests.

The system may identify a culture and personality type of at least one of the two or more interacting individuals by processing an image or video captured during the continuously monitored interaction. After processing the captured image or video to identify a culture and personality type of at least one of the two or more individuals, the system may retrieve cultural/personality profile information specific to the identified culture and personality type of the at least one of the two or more individuals. For example, the system may determine that the first individual 301 may have a culture prevalent among inhabitants of the Bordeaux region of France, and a passive personality. The system may retrieve cultural/personality profile information specific to the culture and personality of the first individual 301 from a database of cultural/personality information. The database of cultural/personality information may be generated similarly to the method for generating the database of cultural personality information 203 described above. The system may identify the culture of the second individual 302 to be, for example, a culture prevalent among inhabitants of Japan. The personality type of the second individual 302 may be, for example, extroverted.

During the continuous monitoring of the two or more individuals, the system may identify a facial expression, gesture, or vocal intonation of at least one of the two or more individuals. For example, the system may monitor the first individual 301 offer a handshake to the second individual 302. The system may identify the offered gesture as a handshake gesture offered by the first individual 301. The system may interpret the handshake, when offered by the first individual 301, to signify that the first individual 301 is manifesting an agreement with the second individual 302 in a respectful manner.

The system may display the meaning of the handshake in the display device 330, using text, for either the first individual 301 or the second individual 302 to read, or for both the first and second individuals 301 and 302 to read in their respective languages.

The interpretation of the identified facial expression, gesture, or vocal intonation may be communicated to a user. The user may be any of the interacting individuals or an individual not a party to the interaction between the two or more individuals. The user may wear a wearable computer or a handheld mobile device.

When the user is the first individual 301, who, for example, offered a handshake to the second individual 302, the system may generate an alert to inform the first individual 301 that a handshake is perceived as an offensive gesture by the first individual 302. The alert may be processed by the system and may be communicated to the first individual 301 via a handheld mobile device 340 that the first individual 301 may be holding. The handheld mobile device 340 may be a mobile phone, a wireless phone, a tablet computer, a smartwatch, and the like. The handheld mobile device 340 may contain software for receiving alerts and communications from the system and for transmitting those alerts to the first individual 301 via a tactile message (e.g., a vibration indicating a received alert or other communication such as a text message or an audible message), a text message, or an audible message (e.g., an earpiece connected to the handheld mobile device 340 that may audibly convey a message to the first individual's 301 ear).

The handheld mobile device 340 may alert the first individual 301 that a handshake is potentially detrimental to a successful interaction with the second individual 302 and may suggest to the first individual 301 to bow to the second individual 302 to increase the probability of a successful interaction with the second individual 302.

The second individual 302 may possess a wearable computer 350. The wearable computer 350 may be a computer-driven device that is worn on the person or clothing of the second individual. The wearable computer 350 may run software that may receive alerts and other communications such as suggestions, hints, and tips from the system for interpreting interpersonal communication and convey the alerts and communications to the second individual 302. The wearable computer 350 may send the second individual 302 a tactile message (e.g., a vibration indicating a received alert or other communication such as a text message or an audible message), a text message, or an audible message (e.g., an earpiece connected to the wearable computer 350 that may audibly convey a message to the second individual 302). The text message or audible message that the wearable computer 350 may convey to the second individual 302 may include, for example, text describing the handshake as an amicable gesture that indicates the first individual's 301 agreement with the second individual 302. The wearable computer 350 may vibrate when receiving an alert (e.g., that the first individual 301 does not intend to offend the second individual 302 by offering a handshake), or when receiving a recommendation such as, for example, encouraging the second individual 302 to bow as a sign of agreement.

The system for interpreting interpersonal communication may continuously monitor the interaction between the two or more individuals. During the continuous interaction, the identified culture and personality type of the at least one of the two or more individuals may be changed. For example, depending on the behavior exhibited by the first individual 301, and the terminology used by the first individual 301, the culture and personality type of the first individual 301 may be changed to a different culture and personality type. For example, the first individual 301 may be re-classified as a French-speaking Canadian with an extroverted personality.

The continuous monitoring of the two or more individuals may lead to identifying a plurality of facial expressions, gestures, and vocal intonations of the interacting individuals. The system may communicate the interpretations of the identified plurality of facial expressions, gestures, and vocal intonations to the user via the display device 330, the handheld mobile device 340, and/or the wearable computer 350.

When an alert and/or message for the user (e.g., the first and second individuals 301 and 302) is available, the delivery or the alerts and/or messages to the user may be instantaneous or delayed. When the delivery is instantaneous, it may be sent to the display device 330, the handheld mobile device 340, and/or the wearable computer 350 substantially instantaneously. When the delivery is delayed, it may be sent to the user via email, when the meeting is over, or it may be uploaded to a database or a public repository.

According to an exemplary embodiment of the present invention, a system for interpreting interpersonal communications may include two or more terminals, each terminal including monitoring devices for monitoring an individual located in the respective terminal.

Each terminal may include a camera and a microphone. The camera in each terminal may display live imagery of the individuals located in the other terminals. For example, a first person located in a first terminal may view a live image of a second person located in a second terminal. The live image of the second person may be captured by the camera included in the second terminal.

A computer system may be connected to the displays, video cameras, and speakers of the two or more terminals. The computer system may include a processor for processing images, video footage, and sounds made by the individuals in the terminals. The computer system may process monitored images and sounds and may assign each individual located in each terminal to a culture and personality type, respectively. The computer system may include a database of cultural/personality information which may be used to retrieve specific cultural and personality information for the individuals assigned to the respective culture and personality types. The computer system, while monitoring the interaction between the two or more individuals in the different terminals, may identify facial expressions, gestures, and vocal intonations of the individuals and may communicate interpretations of the identified facial expressions, gestures, and vocal intonations to a user. The user may be any of the individuals located in the plurality of terminals or a party not associated with the interaction between the individuals in the terminals. The computer system may communicate interpretations of the identified facial expressions, gestures, or vocal intonation to the user as soon as the interpretations of the identified facial expressions, gestures, or vocal intonation are available, or after a delay.

The computer system may be disposed in one of the terminals or may be disposed in another location away from the terminals. When the computer system is not disposed in one of the terminals, the two or more terminals may communicate with the computer system via the Internet (e.g., via a cloud-based system).

During the continuous interaction of the individuals in their respective terminals, the computer system may re-assign (e.g., change) the culture and personality type of at least one of the two or more individuals.

Figure 4:
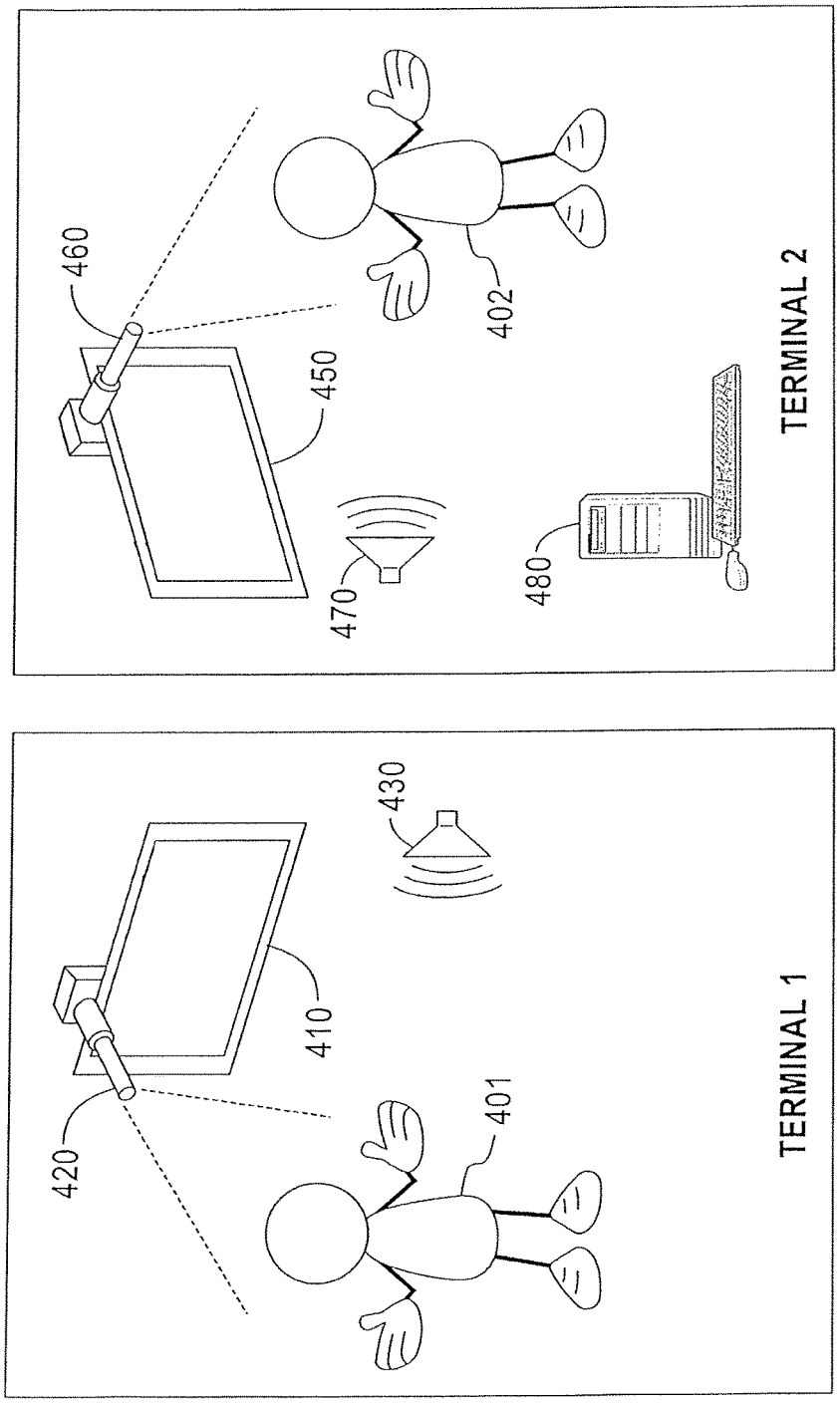
FIG. 4 illustrates a schematic diagram illustrating a system for interpreting interpersonal communication, according to an exemplary embodiment of the inventive concept.

FIG. 4 illustrates a schematic diagram illustrating a system for interpreting interpersonal communication, according to an exemplary embodiment of the inventive concept.

Referring to FIG. 4, the system for interpreting interpersonal communication may include at least two terminals. At least one individual may be located in each terminal. For example, a first individual 401 may be located in terminal 1. A second individual 402 may be located in terminal 2.

Terminal 1 may include a first display device 410, a first camera 420, and a first speaker 430. Terminal 2 may include a second display device 450, a second camera 460, a second speaker 470, and a computer 480.

The first and second individuals 401 and 402 may be teleconferencing with each other. For example, the first display 410 may display live video captured by the second camera 460. The second camera 460 may be configured to maintain focus on the second individual 402 and may be configured to automatically move to maintain focus on the second individual 402 when the second individual 402 moves. The live video may display the second individual 402 interacting with the first individual 401 via the video-conference. The first speaker 430 may emit live sounds captured by a microphone disposed in terminal 2. The microphone located in terminal 2 may be embedded in the second camera 450 or may be disposed on an inner surface of terminal 2 (e.g., where it may capture sounds made by the second individual 402).

The second display 450 may display live video captured by the first camera 420. The first camera 420 may be configured to maintain focus on the first individual 401 and may be configured to automatically move to maintain focus on the first individual 401 when the first individual 401 moves. The second speaker 470 may emit sounds, live, captured by the microphone disposed in terminal 1.

The first and second individuals 401 and 402 may teleconference with each other by seeing live videos of each other and hearing each other via the cameras, display devices, speakers, and microphones disposed in their respective terminals.

The computer 480 may be a mainframe computer, a server, a workstation computer, a desktop PC, or a laptop PC. The computer 480 may be configured to receive still images, videos and sounds made by at least one of the two or more interacting individuals located in the plurality of terminals. For example, the computer 480 may be configured to receive still images or video captured by the first camera 420. The computer 480, for example, may be configured to receive sounds captured by the microphone disposed in terminal 1.

According to an exemplary embodiment of the inventive concept, the computer 480 may be configured to continuously monitor the first individual 401 located in terminal 1 using images and video captured by the first camera 420 and sounds captured by the microphone disposed in terminal 1. The first camera 420 may be configured to automatically move to maintain focus on the first individual 401.

The computer 480 may include a processor to process images, videos, and sounds, (e.g., images containing faces of individuals and sounds made by individuals). A database of cultural/personality information may be stored in the computer 480. The database of cultural/personality information stored in the computer 480 may be similar to the database of cultural/personality information 203 described above. Alternately, the database of cultural personality information might not be stored in the computer 480 but may be accessible to the computer 480.

The computer 480 may process images, videos, and sounds made by at least one person located in at least one terminal to identify a culture and personality type of the at least one person located in the at least one terminal. For example, during the interaction between the first and second individuals 401 and 402, the computer 480 may monitor the interaction between the first and second individuals 401 and 402 and may identify a culture and personality type of the first individual 401 by processing the monitored images, videos, and sounds made by the first individual 401.

The computer 480 may assign the at least one of the two or more interacting individuals to a culture and personality type. Information regarding the culture and personality type assigned to the at least one of the two or more individuals may be retrieved from the database of cultural/personality information. For example, the first individual 401 may be assigned to a culture prevalent among inhabitants of southern India and may be assigned to an extroverted personality type. The second individual 402, for example, may be assigned to a culture prevalent among residents of Myanmar and may be assigned to an extroverted personality type.

Based on the continuous monitoring of the teleconference, the computer 480 may identify a facial expression, gesture, or vocal intonation of at least one of the two or more interacting individuals. The computer 480 may interpret the identified facial expression, gesture, or vocal intonation of the at least one of the two or more individuals and may communicate the interpretation of the identified facial expression, gesture, or vocal intonation to a user. The user may be any of the individuals located in the terminals or an individual not a party to the interaction. The communication may be superimposed in one of the display devices located in the terminals.

For example, the first individual 401 in terminal 1 may exhibit a thumbs-up hand gesture to the second individual in terminal 2 during the teleconference. The computer 480 may identify the thumbs-up gesture as a sign of agreement on the part of the first individual 401. However, the computer 480 may also interpret the thumbs-up gesture as a gesture that may offend the second individual 402 having the culture shared among residents of Myanmar using the cultural/personality information corresponding to the second individual 402. The computer 480 may display the meaning of the thumbs-up gesture on the second display device 450, in text displayed on a portion of the second display device 450 that displays the first individual 401. The system may communicate to the second individual 402 that the meaning of the thumbs-up gesture exhibited by the first individual 401 may be a sign of agreement between the two parties, and that the first individual 401 did not intend to offend the second individual 402.

The computer 480 may also audibly communicate the interpretation of the identified facial expressions, gestures, or vocal intonations to the individuals in terminals using the speakers disposed in each terminal.

The computer 480 may be disposed in one of the terminals, for example, in terminal 2, and may be connected to the second display device 450, the second camera 460, and the second speaker 470 via a wired or wireless connection. When the computer 480 is disposed in one of the terminals, the computer 480 may be configured to monitor images, video, and sound captured by the devices disposed in the other terminals via the Internet. For example, when the computer 480 is disposed in terminal 2, it may be configured to receive images, video, and sound captured by the first camera 420 and the microphone disposed in terminal 1 using the Internet.

Alternatively, the system for interpreting interpersonal communication may be a cloud-based system. In the cloud-based system, there may be two or more terminals as described above for videoconferencing. In the cloud-based system, the computer 480 may be stored away from the terminals and may be connected to the terminals using the Internet. The computer 480 may process images and sounds captured from the terminals and may communicate with the terminals using the Internet. For example, both terminal 1 and terminal 2 may have local computers that may enable a teleconference between the first and second individuals 401 and 402 but the system for interpreting interpersonal communication may include using the computer 480 to monitor the interaction between the two or more individuals (e.g., the first and second individuals 401 and 402), to process the images, video, and sound to identify, interpret, and communicate the interpretation of identified facial expressions, gestures, or vocal intonations to an individual. Images, video, and sound may be uploaded from each terminal to the cloud-based system. After processing the uploaded data, the cloud-based system may assign the individuals into cultural/personality types and may communicate with the terminals by transferring (e.g., having local computers in disposed in the terminals download) data which include communication of the interpretations of identified facial expressions, gestures, or vocal intonations that the individuals located in the terminals exhibited.

The system for interpreting interpersonal communication may re-assign an individual into a different culture and personality profile based on the continuous monitoring of the individual's acts, gestures, vocal intonations, and facial expressions.

The communications to the user or the interacting individuals may be instantaneous or delayed. The communications to the user may further be uploaded into an external database or in a public repository.

According to an exemplary embodiment of the inventive concept, a system for interpreting interpersonal communication may include a processor, a set of monitoring devices, a computer connected to the set of monitoring devices via a cloud-based connection, and a database. The set of monitoring devices may include a handheld mobile device having a processor, a camera, a microphone, a speaker, and a display for displaying messages and camera images. The set of monitoring devices may include a head-mounted device (e.g., glasses) including a processor, a camera, a microphone, and an earpiece (e.g., speaker inserted in the wearer's ear), and a display for displaying messages and camera images. The display of the head-mounted device may be disposed on a lens positioned in front of a wearer's eye and supported by the frame of the head-mounted device.

The system for interpreting interpersonal communication may continuously monitor at least one of two or more interacting individuals using the set of monitoring devices. The system may interpret inter-cultural communication by monitoring at least one of the two or more interacting individuals.

The system for interpreting inter-cultural communication may process images and sounds of at least one of the two or more interacting individuals using the processors in the monitoring devices or using the processor included in the cloud-based system. The processing of images of at least one of the two or more individuals and the processing of sounds made by the at least one of the two or more individuals may be performed in the handheld mobile device or in the head-mounted device. Alternately, the processing of the sound and images of the at least one of the two or more individuals may be performed in the cloud-based computer.

Figure 5:
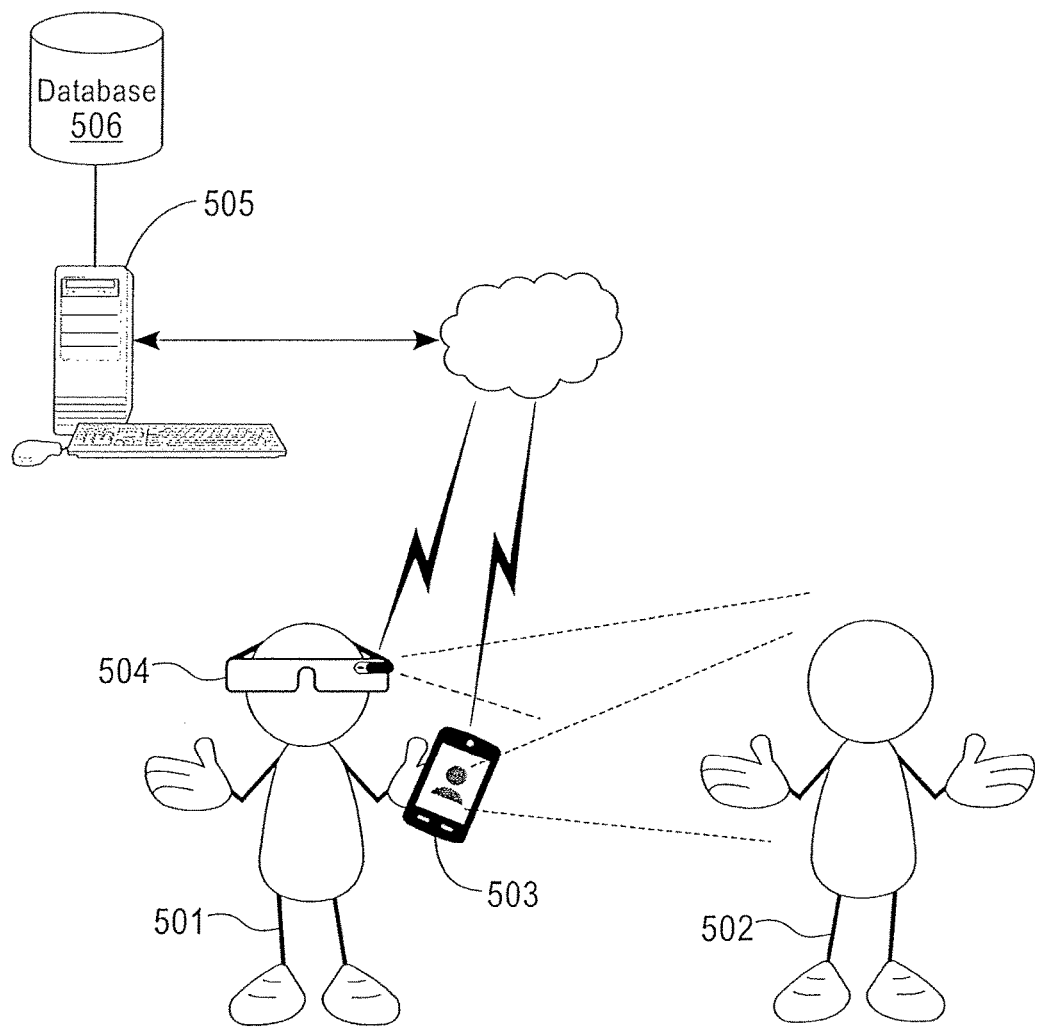
FIG. 5 illustrates a schematic diagram illustrating a system for interpreting interpersonal communication, according to an exemplary embodiment of the inventive concept.

FIG. 5 illustrates a schematic diagram illustrating a system for interpreting interpersonal communication, according to an exemplary embodiment of the inventive concept.

Referring to FIG. 5, the system for interpreting interpersonal communication may include a handheld mobile device 503. The handheld mobile device 503 may be held by a first individual 501. The handheld mobile device 503 may include a processor, a video camera, a microphone, a speaker, and a display.

The camera of the handheld mobile device 503 may be directed to a second individual 502 that may be interacting with the first individual 501. The handheld mobile device 503 may be configured to continuously capture imagery (e.g., video) and sounds made by the second individual 502.

The system for interpreting interpersonal communication may assign the second individual 502 into a cultural and personality profile. The cultural and personality profile assigned to the second individual 502 may contain information specific to culture assigned to the second individual 502. The information specific to the culture assigned to the second individual 502 may be used by the system for interpreting interpersonal communication to increase the productivity of the communication between the first and second individuals 501 and 502. The speaker of the handheld mobile device 503 may audibly translate the words spoken by the second individual 502 in a first language, to words in a second language that the first individual 501 may understand. The screen of the handheld mobile device 503 may display imagery of the second individual 502 and may also display the interpreted facial expressions, gestures, and vocal intonations made by the second individual 502 via text.

The head-mounted device 504 may include a frame with lenses mounted on the head of the first individual 501. The head-mounted device 504 may include a processor, a microphone, and a camera. The head-mounted device 504 may further include a display disposed on a lens and positioned in front of an eye of the wearer (e.g., in front of the first individual's 501 eye), and an earpiece inserted in an ear of the wearer. The head-mounted device 504 may capture videos and sounds made by the second individual 502. The display of the head-mounted device 504 may display the second individual 502 and may also display text messages of interpreted facial expressions, gestures, and vocal intonations made by the second individual 502. The earpiece of the head-mounted device 504 may translate the words spoken by the second individual 502 in a first language to a second language that the first individual 501 may understand. The earpiece of the head-mounted device 504 may also audibly convey interpretations of facial expressions, gestures, and vocal intonations made by the second individual 502 to the second individual's 501 ear.

The system for interpreting interpersonal communication may utilize either the handheld mobile device 503, or the cloud-based computer 505 at one time.

The processing of the images and sound may occur in the head-mounted device 504, in the handheld mobile device 503, or in a cloud-based computer 505.

The cloud-based computer 505 may be connected to the head-mounted device 504 or to the handheld mobile device 503 via the Internet. For example, either the handheld mobile device 503, or the head-mounted device 504 may be connected to the computer 505 via the Internet and upload video imagery and sound captured be their respective cameras and microphones to the computer 505. The computer 505 may process the received video imagery and sound using a database 506 of cultural and personality types. The computer 505, using the database 506 of cultural and personality types, may assign the individual 502 to a specific cultural and personality type, may re-assign the individual 502 to a different cultural and personality type and may interpret gestures, vocal intonations, or facial expressions of the second individual 502 using the received video imagery and sound. The assignment and re-assignment into culture/personality type profiles and the interpretation of an individual's gestures may be done by continuously monitoring the individual's gestures, facial expressions or vocal intonations using the handheld mobile device 503 or the head-mounted device 504. The computer 505 may transmit the interpretation of the gestures, vocal intonations, or facial expressions of the second individual 502 to the handheld mobile device 503, or the head-mounted device 504. The handheld mobile device 503 may display the received transmittance of the interpretation of the gestures, vocal intonations, or facial expressions of the second individual 502 in its display, using text, or may audibly convey the received message to the first individual 501 via its speaker. The head-mounted device 504 may convey the received message to the first individual 501 via the head-mounted device's 504 display, using text, or audibly, via the head mounted device's 504 earpiece.

The transmittance of the interpretations of the gestures, vocal intonations, or facial expressions of at least one of the two or more interacting individuals may be delayed and may be sent to the respective interacting individuals via email or may be uploaded in databases accessible by the respective individuals, or may be uploaded to a public encyclopedia such as Wikipedia.

Figure 6:
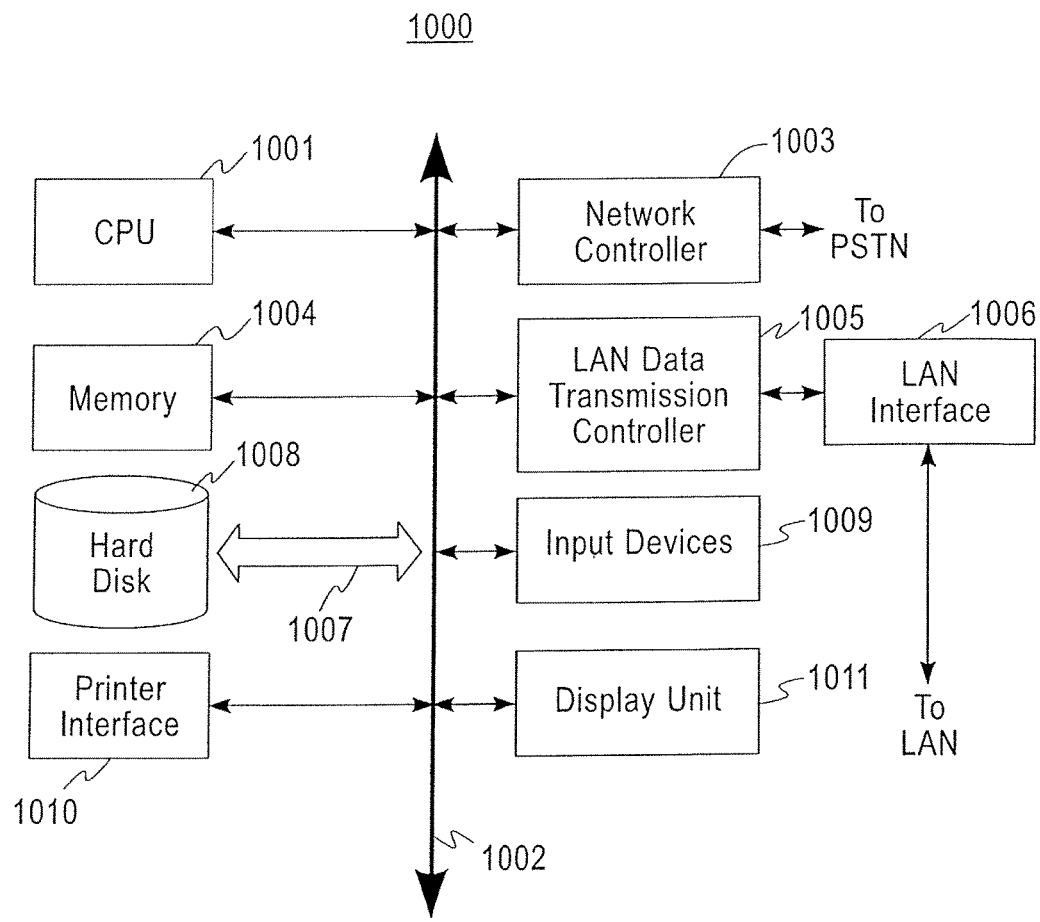
FIG. 6 illustrates an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

While the present invention has been particularly shown and described with reference to exemplary embodiments thereof, it will be understood by those of ordinary skill in the art that various changes in form and detail may be made therein without departing from the spirit and scope of the present invention.

What is claimed is:

1. A system for interpreting interpersonal communication, comprising:
a processor;
a set of monitoring devices including a camera, a video camera, or a microphone; and
a non-transitory, tangible program storage medium, readable by the system for interpreting interpersonal communication, embodying a program of instructions executable by the processor, to perform method steps for interpreting interpersonal communication, the method comprising:
monitoring a first interaction between two or more individuals using the set of monitoring devices including the camera, the video camera, or the microphone;
identifying a culture and personality type of at least one of the two or more individuals based on the monitored first interaction;
retrieving first cultural/personality profile information specific to the identified culture and personality type from a database of cultural/personality profile information;
monitoring a second interaction between the two or more individuals using the set of monitoring devices including the camera, the video camera, or the microphone;
identifying a first facial expression, gesture, vocal intonation, or indication of emotional state derived from biometric data of the at least one of the two or more individuals based on the monitored second interaction;
interpreting the identified first facial expression, gesture, vocal intonation, or indication of emotional state derived from biometric data using the first cultural/personality profile information; and
communicating the interpretation of the identified first facial expression, gesture, vocal intonation, or indication of emotional state derived from biometric data to a user;
wherein the user and the at least one of the two or more individuals are the same person.

2. The system of claim 1, wherein the set of monitoring devices includes one or more cameras mounted and pointed toward the at least one of the two or more individuals, and wherein the one or more cameras are configured to automatically move to maintain focus on the at least one of the two or more individuals.

3. The system of claim 2, further comprising a wearable computer worn by the user, wherein the wearable computer receives a message, and wherein the message includes the communication of the interpretation of the identified first facial expression, gesture, vocal intonation, or indication of emotional state derived from biometric data, via a textual message, an audible message, or a tactile message.

4. The system of claim 1, further comprising a handheld mobile device, wherein communicating the interpretation of the identified first facial expression, gesture, vocal intonation, or indication of emotional state derived from biometric data to the user includes sending the user a text message that is displayed on the handheld mobile device.

5. A system for video conferencing, comprising:
a processor;
two or more terminals, each of the two or more terminals including a set of monitoring devices including a camera, a video camera, or a microphone; and
a non-transitory, tangible program storage medium, readable by the system for interpreting interpersonal communication, embodying a program of instructions executable by the processor, to perform method steps for interpreting interpersonal communication, the method comprising:
monitoring a first interaction between two or more individuals, wherein a first individual of the two or more individuals is located at a first terminal of the two or more terminals, wherein a second individual of the two or more individuals is located at a second terminal of the two or more terminals, and wherein monitoring the first interaction between the two or more individuals includes using the set of monitoring devices including the camera, the video camera, or the microphone included in each of the first and second terminals to monitor the first and second individuals, identifying a culture and personality type of at least one of the first and second individuals based on the monitored first interaction;
retrieving first cultural/personality profile information specific to the identified culture and personality type from a database of cultural/personality profile information;
monitoring a second interaction between the first and second individuals located at the first and second terminals using the set of monitoring devices including the including the camera, the video camera, or the microphone included in each of the first and second terminals;
identifying a first facial expression, gesture, vocal intonation, or indication of emotional state derived from biometric data of the at least one of the first and second individuals based on the monitored second interaction;
interpreting the identified first facial expression, gesture, vocal intonation, or indication of emotional state derived from biometric data using the first cultural/personality profile information; and
communicating the interpretation of the identified first facial expression, gesture, vocal intonation, or indication of emotional state derived from biometric data to a user;
wherein the user and the at least one of the two or more individuals are the same person.

6. The system of claim 5, wherein the system for video conferencing is a cloud-based system, the cloud-based system including the two or more terminals communicating with the processor over the Internet.

7. The system of claim 5, wherein each of the first and second terminals, among the two or more terminals, includes a display device and a camera device, wherein the camera device included in the second terminal is configured to automatically move to maintain focus on the second individual, wherein the display device included in the first terminal is configured to display a camera image captured by the camera device included in the second terminal.

8. The system of claim 7, wherein communicating the interpretation of the identified first facial expression, gesture, vocal intonation, or indication of emotional state derived from biometric data to the user includes displaying a textual message on the display device included in the first terminal.

* * * * *